US012338973B2

(12) United States Patent
Van Bommel et al.

(10) Patent No.: US 12,338,973 B2
(45) Date of Patent: Jun. 24, 2025

(54) ADAPTABLE TRACK LIGHTING SYSTEM

(71) Applicant: SIGNIFY HOLDING B.V., Eindhoven (NL)

(72) Inventors: Ties Van Bommel, Horst (NL); Robert Jacob Pet, Waalre (NL)

(73) Assignee: SIGNIFY HOLDING, B.V., Eindhoven (NL)

(*) Notice: Subject to any disclaimer, the term of this patent is extended or adjusted under 35 U.S.C. 154(b) by 0 days.

(21) Appl. No.: 18/722,005

(22) PCT Filed: Dec. 21, 2022

(86) PCT No.: PCT/EP2022/087170
§ 371 (c)(1),
(2) Date: Jun. 20, 2024

(87) PCT Pub. No.: WO2023/131529
PCT Pub. Date: Jul. 13, 2023

(65) Prior Publication Data
US 2025/0052386 A1 Feb. 13, 2025

(30) Foreign Application Priority Data
Jan. 6, 2022 (EP) .................................... 22150456

(51) Int. Cl.
*F21S 8/06* (2006.01)
*F21V 21/005* (2006.01)
(Continued)

(52) U.S. Cl.
CPC ............ *F21S 8/066* (2013.01); *F21V 21/005* (2013.01); *F21V 21/35* (2013.01); *F21Y 2113/00* (2013.01); *F21Y 2115/10* (2016.08)

(58) Field of Classification Search
CPC ......... F21S 8/066; F21V 21/005; F21V 21/35
See application file for complete search history.

(56) References Cited

U.S. PATENT DOCUMENTS 6,893,139 B2 * 5/2005 Cercone .................. F21V 21/26 362/225
7,221,104 B2 * 5/2007 Lys ........................ H05B 45/46 315/312

(Continued)

FOREIGN PATENT DOCUMENTS

CN 201218479 Y 4/2009
CN 201812453 U 4/2011

(Continued)

*Primary Examiner* — Bryon T Gyllstrom

(57) ABSTRACT

The present invention relates to a track lighting system (1) comprising: a power track (2) having a longitudinal extension (L) and being connectable to an electric supply; a plurality of individually controllable lighting devices comprising at least one first lighting device (3) and at least one second lighting device (4), each being connectable to the power track (2), wherein the at least one first lighting device (3) comprises a first light source and a first light exit window (5) having a first form factor, wherein the at least one second lighting device (4) comprises a second light source and a second light exit window (6) having a second form factor; wherein at least one first lighting device (3) is a first pixelated lighting device wherein the first light source comprises a plurality of individually controllable first LED pixels; wherein the track lighting system (1) further comprises at least one control unit arranged to individually control the lighting devices (3, 4); and wherein the control unit is further arranged to control at least one first LED pixel of the plurality of individually controllable first LED pixels of the at least one first lighting device (3) to illuminate only a first portion of the first light exit window such that a light pattern is providable by the track lighting system (1) in the first light exit window.

13 Claims, 3 Drawing Sheets

(51) Int. Cl.

| | |
|---|---|
| ***F21V 21/35*** | (2006.01) |
| ***F21Y 113/00*** | (2016.01) |
| ***F21Y 115/10*** | (2016.01) |

(56) References Cited

U.S. PATENT DOCUMENTS

| | | | | |
|---|---|---|---|---|
| 11,175,026 | B1* | 11/2021 | Yu | F21V 21/088 |
| 2003/0021116 | A1* | 1/2003 | Miller | F24F 13/078<br>362/249.01 |
| 2012/0063138 | A1 | 3/2012 | Leadford et al. | |
| 2013/0155672 | A1* | 6/2013 | Vo | F21V 21/15<br>362/382 |
| 2015/0198311 | A1* | 7/2015 | O'Brien | F21S 8/066<br>362/220 |
| 2015/0312975 | A1* | 10/2015 | Tischler | H01S 5/042<br>315/294 |
| 2017/0181242 | A1* | 6/2017 | Johnson | H05B 45/37 |
| 2018/0160891 | A1* | 6/2018 | Ahearn | A61B 90/30 |
| 2018/0224104 | A1* | 8/2018 | Bernard | F21S 8/04 |
| 2021/0259083 | A1* | 8/2021 | Vissenberg | H05B 47/155 |
| 2023/0125172 | A1* | 4/2023 | Budavari | F21V 21/35<br>362/368 |

FOREIGN PATENT DOCUMENTS

| | | | |
|---|---|---|---|
| CN | 206055228 | U | 3/2017 |
| JP | 2019145284 | A | 8/2019 |
| WO | 2020212464 | A1 | 10/2020 |

* cited by examiner

ADAPTABLE TRACK LIGHTING SYSTEM

CROSS-REFERENCE TO PRIOR APPLICATIONS

This application is the U.S. National Phase application under 35 U.S.C. § 371 of International Application No. PCT/EP2022/087170, filed on Dec. 21, 2022, which claims the benefit of European Patent Application No. 22150456.6, filed on Jan. 6, 2022. These applications are hereby incorporated by reference herein.

TECHNICAL FIELD

The present invention relates to a track lighting system comprising a power track and a plurality of individually controllable lighting devices. Further, the present invention relates to a method for controlling such a track lighting system.

BACKGROUND

Setting a correct light in an interior environment is of large importance. First of all, a correctly illuminated room is perceived by the user as attractive and pleasant to reside. Thus, in an industrial site or in a workshop, the light setting may be used for providing conditions in which the operators have a clear view of objects that they are working on. This is particularly important when objects comprise small parts to be assembled, or when the operator has to perform the work in an obstructed environment, such as under a vehicle or the like. In a home environment, it may be desirable to adapt the lighting conditions to the activity of subjects residing a room.

A lighting system used in an interior environment should be highly adaptable, giving the user possibility to control different parts of the lighting system independently, such that the light setting may be adapted to a current situation.

Lighting systems addressing some of the aspects above are track lighting systems, wherein luminaires are fitted on tracks. Such lighting systems provide great flexibility and adaptability, since the number as well as positioning of the luminaires along the track may be varied. However, there is a need for providing an increased adaptability of track lighting systems, wherein the user may select different operating conditions of the track lighting system, depending on the current needs.

SUMMARY OF THE INVENTION

The object of the present invention is to provide such a track lighting system. To this end, the present invention provides a track lighting system comprising a power track having a longitudinal extension and being connectable to an electric supply. The power track is arranged to provide electric output. The power track according to the present invention may be automatically or manually controlled. The automatic control may be dependent on the natural light conditions in the room, or on the predefined period of time when the track lighting system should be operating, e.g. during normal working hours. In other words, the automatic control of the power track may determine whether the power track will provide electric output, and if so, of what magnitude.

The track lighting system of the present invention further comprises a plurality of individually controllable lighting devices comprising at least one first lighting device and at least one second lighting device. In particular, the track lighting system may comprise from 1 to 20 first lighting devices, and from 1 to 20 second lighting devices. The first lighting devices and the second lighting devices may be arranged alternatingly, i.e. each first lighting device is arranged between two second lighting devices. Alternatively, the first lighting devices and the second lighting devices may be arranged in any other order, such as in alternating groups. Each lighting device of the plurality of lighting devices is (mechanically and electrically) connectable to the power track. By the term "connectable" is in the context of the present invention meant at least mechanically or electrically connectable. Mechanical connection implies a direct contact between the lighting device and the power track. Mechanical connection may be provided by means of at least one fastening element, such a clip or the like. Electrical connection may be provided by means of an electrical connection element, such as plug-and-socket or a pin contact. Alternatively, electrical connection may be achieved wirelessly, e.g. through induction. If the lighting device is only mechanically connected to the power track, the electrical power supply to lighting device may be provided by an external power supply source, such as a disposable or rechargeable battery. Preferably, the lighting device is both mechanically and electrically connected to the power track.

The at least one first lighting device comprises a first light source and a first light exit window having a first form factor. The term "form factor" in the context of the present invention implies an aspect that defines and prescribes the size, shape, and other physical specifications of the light exit window. The at least one second lighting device comprises a second light source and a second light exit window having a second form factor. The first form factor may be same as or different from the second form factor. The first form factor and/or the second form factor may be circular, elliptical, or polygonal having at least 3 sides. In particular, the first form factor may be circular, and the second form factor may be rectangular. Alternatively, said second form factor may be polygonal. In other words, the track lighting system may comprise a plurality of lighting devices being a mixture of circular and rectangular lighting devices. Alternatively, all the lighting devices in the plurality of lighting devices may have the same form factor, i.e. all the lighting devices may be circular or rectangular. Alternatively, all lighting devices may be polygonal.

Throughout, said phrasing of the second form factor may be rectangular or polygonal may be phrased alternatively as the second form factor may be 'substantially rectangular' or 'substantially polygonal'. Hence, for example, a rectangular form factor having smoothed edges, or trimmed edges, may still be a rectangular form factor.

According to the present invention, at least one first lighting device is a first pixelated lighting device wherein the first light source comprises a plurality of individually controllable first LED pixels. The number of first LED pixels may be at least 10, preferably at least 20, more preferably at least 25, even more preferably at least 50, most preferably at least 100. The first LED pixels may be arranged in a M by N matrix of first LED pixels, wherein M is at least 10 and N is at least 10. Hence, the first LED pixels may be arranged in a (planar) matrix comprising at least 10 first LED pixels in a first direction, and at least 10 LED pixels in a second direction orthogonal to the first direction.

The track lighting system according to the present invention further comprises at least one control unit arranged to individually control the lighting devices. The control unit may be of any kind known in the art. The control unit is further arranged to control at least one first LED pixel of the plurality of individually controllable first LED pixels of the at least one first lighting device to illuminate only a first portion of the first light exit window such that a light pattern is providable by the track lighting system in the first light exit window.

The term "light pattern" in the context of the present invention is intended to mean any predefined pattern that may be desired by the user. Such a pattern may be a straight line, a zig-zag line, a plurality of parallel lines or the like. Preferably, the light pattern is a substantially linear pattern.

The light pattern, in the context of the present invention, is a light pattern of a respective light exit window. For example, the light pattern may be a pattern projected onto the respective light exit window, such that the light pattern may be providable, or: visible, in the first light exit window.

In aspects, the control unit is arranged to control at least one first LED pixel of the plurality of individually controllable first LED pixels of the at least one first lighting device to illuminate only a first portion of the first light exit window such that a light pattern is providable by the track lighting system in the first light exit window, wherein the light pattern comprises the second form factor of the second light exit window.

In particular, the first lighting device may provide a first light pattern and the second lighting device may provide a second light pattern in the second light exit window. In a first operational mode, the first light pattern may be substantially similar, or: substantially equal, to the second light pattern. For instance, if the track lighting system comprises a plurality of circular first lighting devices and a plurality of rectangular second lighting devices, the first lighting devices may be pixelated lighting devices, and the first LED pixels may be operated such that a rectangular light pattern is provided by the circular first lighting devices. In particular, the first light pattern provided by the first lighting devices may be similar, or: substantially equal, in shape and/or size to the second light exit window of the second lighting devices. Accordingly, the track lighting system according to the present invention provides improved flexibility, such that a desired pattern is easily obtainable by individually controlling LED pixels. In particular, the user may select an operation mode wherein the track lighting system provides a light pattern being an aesthetically appealing straight line, regardless of the form factor of the first and the second lighting devices.

In embodiments, the first light pattern may be the same shape as the second form factor. For example, the first light pattern may be equal to the shape of the second form factor of the second lighting device.

The first light pattern provided by the first lighting devices may have has a first width W1 and the second light pattern has a second width W2. If the user wishes to obtain a light pattern in the form of a straight line, the second width W2 may be similar, or: equal, to the first width W1.

Further, the first light pattern may have a first length L1 and the second light pattern may have a second length L2. In order to obtain a symmetrical light pattern, the second length L2 may be similar, or: equal, to the first length L1.

The aesthetical appearance of the light pattern is even further increased if the first light pattern is aligned with the second light pattern.

In aspects, the second light pattern may comprise the form factor of the first exit window. Hence, the second exit window may be circular, whilst the first exit window may comprise an elongated rectangular form factor, e.g. a line. The second light pattern may then be, or phrase differently: mimic, said elongated rectangular form factor, while the second exit window is circular. This enables that a circular lighting device may still align with adjacent lighting devices having an elongated rectangular form factor.

According to the present invention, the at least one second lighting device may be a second pixelated lighting device. In such an embodiment, the second light source comprises a plurality of individually controllable second LED pixels. The control unit may then be further arranged to control at least one second LED pixel of the plurality of individually controllable second LED pixels of the second lighting device. Such an embodiment offers the advantage of a highly adaptable track lighting system. For instance, the first and second lighting devices may be rectangular, while giving the user a possibility to select between different light patterns by individually controlling the first and second LED pixels, as will be described in greater detail below.

It is further conceivable that the second lighting device is a non-pixelated lighting device. In such an embodiment, the first LED pixels of the first lighting device may be controlled such that the light pattern provided by the first lighting device correspond to the form factor of the second lighting device.

The plurality of individually controllable lighting devices may further comprise at least one third lighting device being connectable to the power track. The at least one third lighting device comprises a third light source and a third light exit window having a third form factor. The at least one third lighting device may be a third pixelated lighting device, wherein the third light source comprises a plurality of individually controllable third LED pixels. The control unit may then be further arranged to control at least one third LED pixel of the plurality of individually controllable third LED pixels of the at least one third lighting device. The third form factor may be different from the first and the second form factors. In other words, the track lighting system may comprise three different types of lighting devices in a decorative arrangement. For instance, the track lighting system may comprise square, circular and elongated lighting device, which in one operation mode may be fully illuminated, thus providing a functional light. The user may want to amend this light to a stand-by light, for instance when a store is closed. In order to provide such a stand-by light, the user may individually control the LED pixels of the lighting devices, such that a portion of the first LED pixels is depowered such that the first light exit window is not fully illuminated, such that a light pattern in the form of a straight line is provided by the track lighting system.

At least one of the plurality of lighting devices may be rotatable in relation to the longitudinal extension L of the power track. The axis of rotation may be perpendicular to the longitudinal extension L of the power track. In such an embodiment, the track lighting system has increased flexibility, since the user may select the orientation of the rotatable lighting devices and may then individually control the LED pixels such that a desired light pattern is provided.

The least one lighting device of the plurality of lighting devices may arranged adjacent to the power track. In other words, the at least one lighting device may be in physical contact with the power track. Further, at least one lighting device of the plurality of each lighting device may be arranged at a distance from the power track, e.g. by being suspended from the power track. In order to optimize the light pattern provided by the track lighting system, each lighting device of the plurality of lighting devices may be arranged at a distance from the power track, wherein the distance between each lighting device and the power track is constant.

The at least one first pixelated lighting device may comprise a light mixing chamber comprising a first compartment having a first compartment shape and a second compartment having a second compartment shape. The first compartment shape may have a compartment width and a compartment length, wherein at least the compartment width may be substantially equal to the width of the second light exit window. In order to attain both the desired sharp borders of illuminated portions of the light exit window of a pixelated lighting device, yet still enabling a uniform intensity of the entire light exit window when needed, the pixelated lighting device may comprise at least one wall dividing the pixelated lighting device into the first and the second compartment. The material of the wall may comprise a light-transmissive material. Alternatively, or additionally, the wall may be arranged substantially perpendicularly to the light exit window of the at least one pixelated lighting device, and may comprise an tapered outer edge being adjacent to the light exit widow. In such an embodiment, the wall is virtually invisible through the light exit window when the adjacent sub-chambers are switched on, thus increasing uniformity of the illuminated light exit window.

The wall may comprise an inner surface facing the LED pixel, and an outer surface facing away from said LED pixel. The inner surface of the wall may comprise a reflective coating, thus confining the light within the sub-chamber comprising the LED pixel. On the other hand, the light is still allowed to enter the wall from the uncoated side.

As mentioned above, the track lighting system according to the present invention comprises a control unit. The control unit may be used for automatic and/or manual control of the power track and the lighting devices. The light settings of the lighting devices may automatically adjust to the ambient light or may be controlled by a timer. Alternatively, or additionally, the lighting devices may be manually controlled by the user, allowing to adjust the light settings of the lighting devices according to the user's requirements.

The present invention further relates to a method for controlling a lighting system described above, the method comprising the steps of:

a) receiving information on a desired light pattern of the lighting system;
b) individually controlling the lighting devices and the at least one first LED pixel of the plurality of individually controllable first LED pixels of the at least one first lighting device to illuminate only a first portion of the first light exit window such that the desired light pattern is obtained in the first light exit window.

BRIEF DESCRIPTION OF THE DRAWINGS

Embodiments of the invention will now be described by way of example with reference to the accompanying drawings, of which.

Figure 1:
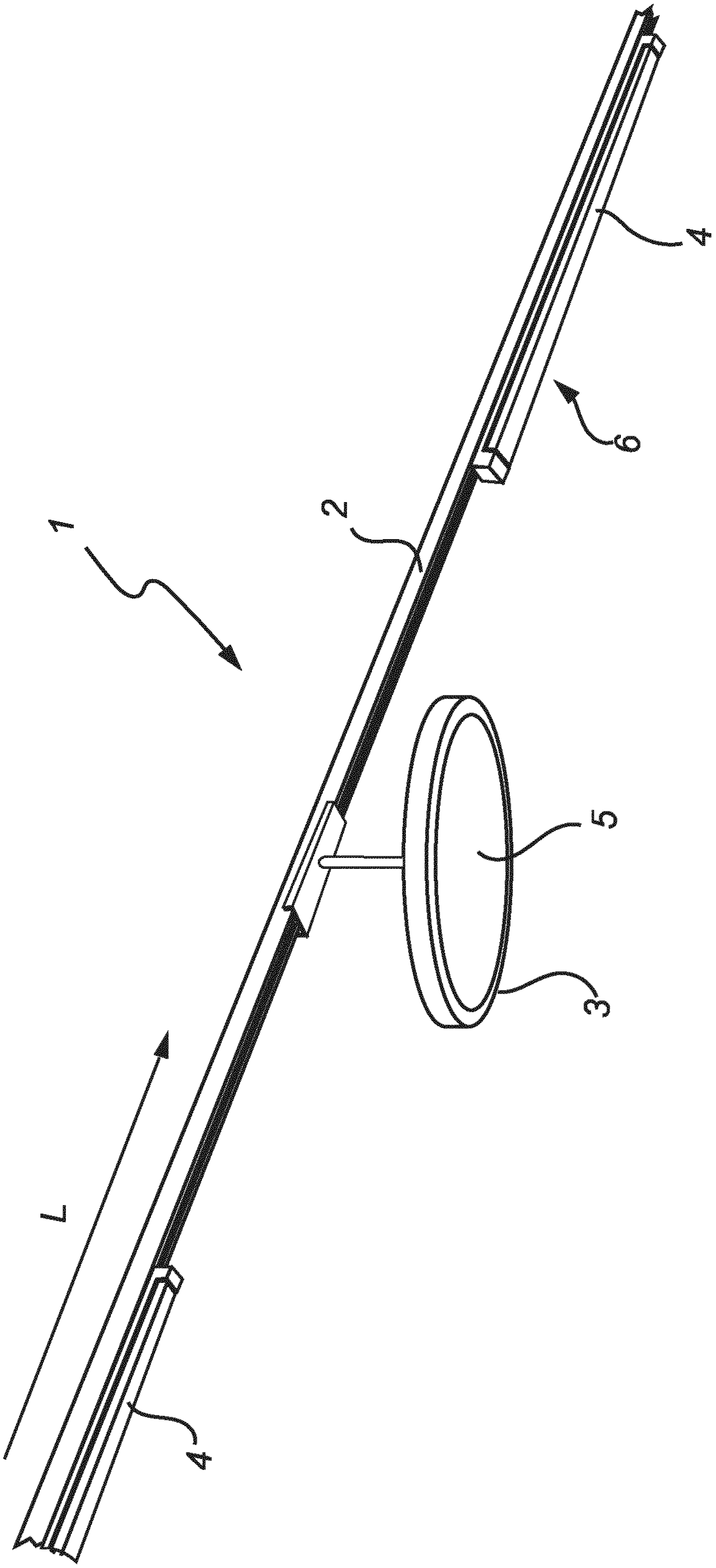
FIG. 1 is a perspective view of the track lighting system of the present invention.

All the figures are schematic, not necessarily to scale, and generally only show parts which are necessary in order to elucidate embodiments of the present invention, wherein other parts may be omitted or merely suggested.

DETAILED DESCRIPTION OF THE INVENTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 illustrates a track lighting system 1 comprising a power track 2 having a longitudinal extension and being connectable to an electric supply. The power track 2 is arranged to provide electric output.

The track lighting system of the present invention further comprises a plurality of individually controllable lighting devices comprising one first lighting device 3 and two second lighting devices 4. The first lighting device 3 and the second lighting devices 4 are arranged alternatingly, i.e. the first lighting device 3 is arranged between two second lighting devices 4. Each lighting device 3, 4 of the plurality of lighting devices is connectable to the power track 2.

The first lighting device 3 comprises a first light source (not shown) and a first light exit window 5 having a first form factor. As may be seen in FIG. 1, the first form factor is circular. Each second lighting device 4 comprises a second light source (not shown) and a second light exit window 6 having a second form factor. The second form factor is rectangular. In other words, the track lighting system 1 comprises a plurality of lighting devices being a mixture of circular and rectangular lighting devices 3, 4. Alternatively, said second form factor may be polygonal in alternative aspects, for example said polygonal form factor may be a pentagon, a hexagon, a heptagon, an octagon, a decagon, or equilateral triangle.

The first lighting device 3 is a first pixelated lighting device wherein the first light source comprises a plurality of individually controllable first LED pixels.

Figures 2A, 2B, 2C:
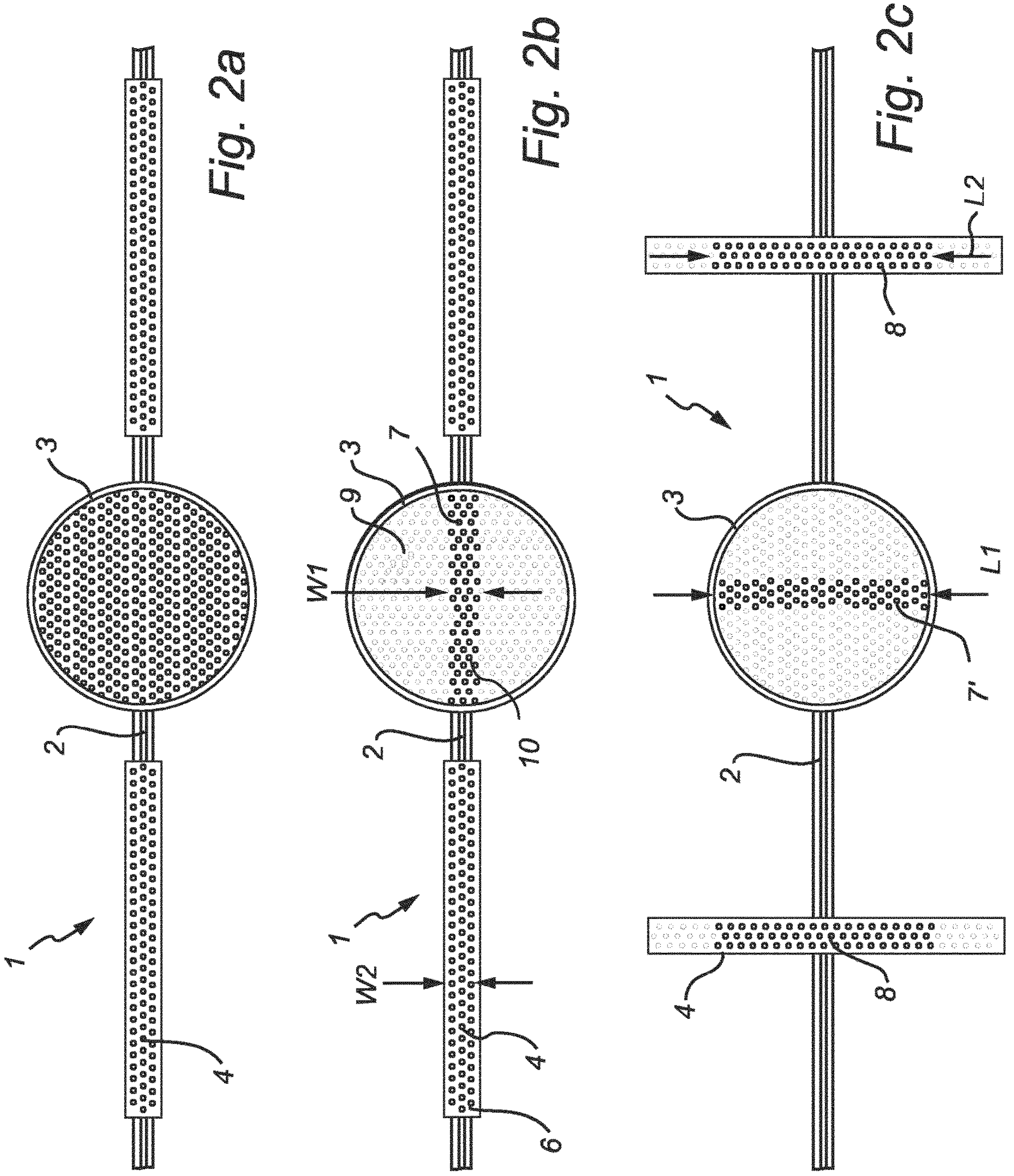
FIGS. 2*a-c* are a lateral views of the track lighting system shown in FIG. 1.

Turning the attention to FIG. 2, different operating modes of the track lighting system are shown. Thus, in FIG. 2*a*, all the lighting devices 3, 4 are illuminated, which may be desirable when the area needs to be provided with working light. As described above, the control unit may individually control LED pixels of the first lighting device 3, such that only a first portion 7 of the first lighting device is illuminated, thus providing a light pattern in the form of a straight line, as depicted in FIG. 2*b*. In the embodiment shown in FIG. 2*c*, both the first lighting device 3 and the second lighting devices 4 are pixelated lighting devices. Further, the second lighting devices 4 are rotatable. Thus, a light pattern may be provided in the form of parallel lines by controlling the LED pixels of the first lighting device 3 such that a second portion 7' is illuminated, and further controlling the LED pixels of the second lighting devices such that the length of the illuminated portion 8 of the second lighting device is equal to the diameter of the first lighting device, i.e. the second portion 7'.

Figure 3A:
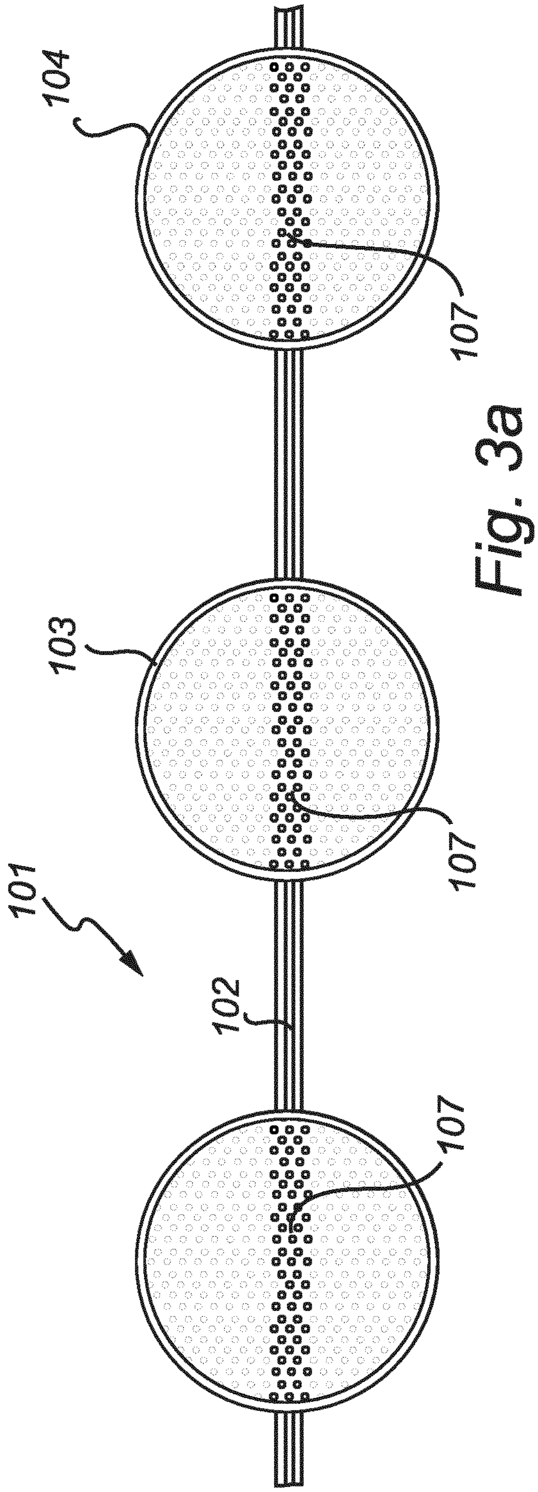
FIGS. 3*a-b* are a lateral views of the track lighting system according to other embodiments of the present invention.

In the embodiment shown in FIG. 3*a*, a track lighting system 101 is shown, wherein the first lighting device 103 and the second lighting devices 104 are pixelated lighting devices, and wherein the first form factor of the first lighting device 103 is the same as the second form factor of the second lighting devices 104, i.e. circular. As may be seen in FIG. 3*a*, the track lighting system 101 may be operated by controlling the LED pixels of the first and second lighting devices 103, 104 such that a light pattern 107 is provided in the first light exit window in the form of a straight line.

Figure 3B:
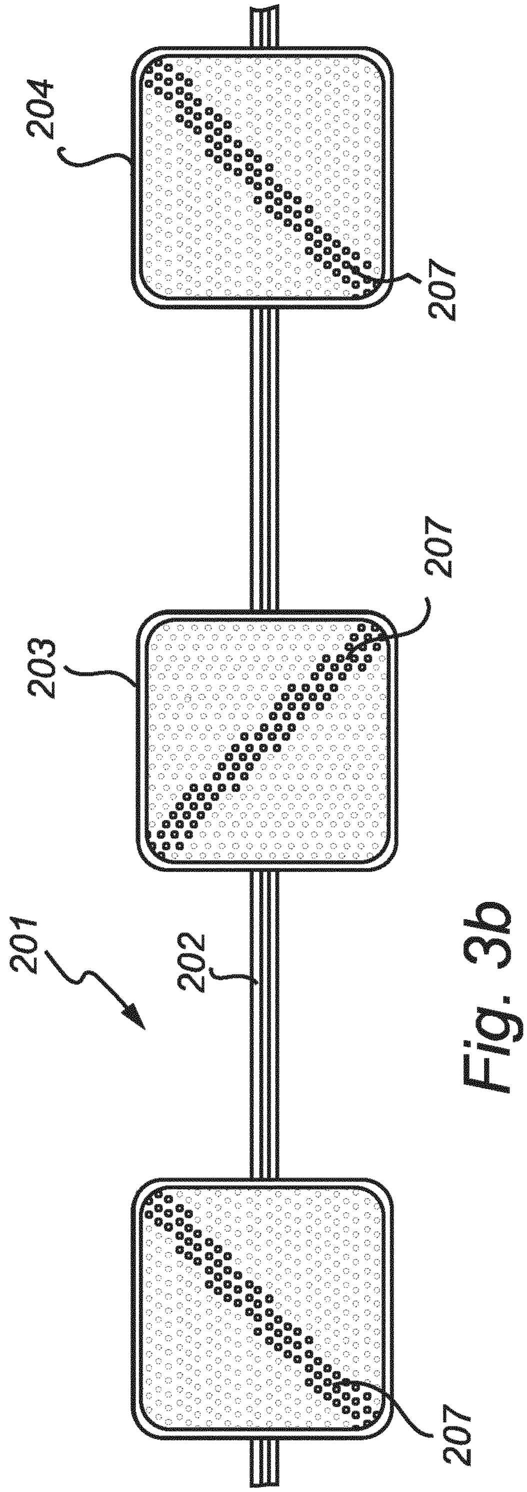

Finally, in the embodiment shown in FIG. 3*b*, a track lighting system 201 is shown, wherein the first lighting device 203 and the second lighting devices 204 are pixelated lighting devices, and wherein the first form factor of the first lighting device 203 is the same as the second form factor of the second lighting devices 204, i.e. square. As may be seen in FIG. 3*b*, the track lighting system 201 may be operated by controlling the LED pixels of the first and second lighting devices 203, 204 such that a light pattern 207 is provided in the form of a zigzag line.

Although the present invention has been described with reference to various embodiments, those skilled in the art will recognize that changes may be made without departing from the scope of the invention. It is intended that the detailed description be regarded as illustrative and that the appended claims including all the equivalents are intended to define the scope of the invention. While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A track lighting system comprising:

a power track having a longitudinal extension and being connectable to an electric supply;

a plurality of individually controllable lighting devices comprising at least one first lighting device and at least one second lighting device, each being connectable to said power track, wherein said at least one first lighting device comprises a first light source and a first light exit window having a first form factor, wherein said at least one second lighting device comprises a second light source and a second light exit window having a second form factor;

wherein at least one first lighting device is a first pixelated lighting device wherein said first light source comprises a plurality of individually controllable first LED pixels;

wherein said track lighting system further comprises at least one control unit arranged to individually control said lighting devices; and wherein said control unit is further arranged to control at least one first LED pixel of said plurality of individually controllable first LED pixels of said at least one first lighting device to illuminate only a first portion of the first light exit window such that a first light pattern is providable by said track lighting system in the first light exit window.

2. The track lighting system according to claim 1, wherein said first form factor is different from said second form factor.

3. The track lighting system according to claim 1, wherein said first form factor is circular and said second form factor is rectangular.

4. The track lighting system according to claim 1, wherein said second lighting device provides a second light pattern in the second light exit window, wherein in a first operational mode said first light pattern is substantially equal to said second light pattern.

5. The track lighting system according to claim 4, wherein said second light pattern is substantially equal in shape and size to said second light exit window.

6. The track lighting system according to claim 4, wherein in said first operational mode said first light pattern has a first width and said second light pattern has a second width substantially equal to said first width.

7. The track lighting system according to claim 4, wherein in said first operational mode said first light pattern has a first length and said second light pattern has a second length substantially equal to said first length.

8. The track lighting system according to claim 1, wherein said second lighting device is a second pixelated lighting device, wherein said second light source comprises a plurality of individually controllable second LED pixels; and wherein said control unit is further arranged to control said at least one second LED pixel of said plurality of individually controllable second LED pixels of said at least one second lighting device.

9. The track lighting system according to claim 1, wherein the plurality of individually controllable lighting devices further comprises at least one third lighting device being connectable to said power track, wherein said at least one third lighting device comprises a third light source and a third light exit window having a third form factor, wherein said at least one third lighting device is a third pixelated lighting device, wherein said third light source comprises a plurality of individually controllable third LED pixels, and wherein said control unit is further arranged to control said at least one third LED pixel of said plurality of individually controllable third LED pixels of said at least one third lighting device; wherein said third form factor is different from said first and said second form factors.

10. The track lighting system according to claim 1, wherein at least one of said plurality of lighting devices is rotatable in relation to said longitudinal extension of said power track.

11. The track lighting system according to claim 1, wherein at least one lighting device of said plurality of lighting devices is arranged at a distance from said power track, and wherein said distance between each lighting device and said power track is constant.

12. The track lighting system according to claim 1, wherein said at least one first pixelated lighting device comprises a light mixing chamber comprising a first compartment having a first compartment shape and a second compartment having a second compartment shape, said first compartment shape has a compartment width and a compartment length, wherein at least said compartment width is substantially equal to the width of said second light exit window.

13. A method for controlling a lighting system comprising a power track having a longitudinal extension and being connectable to an electric supply;

a plurality of individually controllable lighting devices comprising at least one first lighting device and at least one second lighting device, each being connectable to said power track, wherein said at least one first lighting device comprises a first light source and a first light exit window having a first form factor, wherein said at least one second lighting device comprises a second light source and a second light exit window having a second form factor;

wherein at least one first lighting device is a first pixelated lighting device wherein said first light source comprises a plurality of individually controllable first LED pixels;

wherein said track lighting system further comprises at least one control unit arranged to individually control said lighting devices; and wherein said control unit is further arranged to control said at least one first LED pixel of said plurality of individually controllable first LED pixels of said at least one first lighting device, said method comprising the steps of:

a) receiving information on a desired light pattern of said track lighting system;

b) individually controlling said lighting devices and said at least one first LED pixel of said plurality of individually controllable first LED pixels of said at least one first lighting device to illuminate only a first portion of the first light exit window such that said desired light pattern is obtained in the first light exit window.

* * * * *